United States Patent Office.

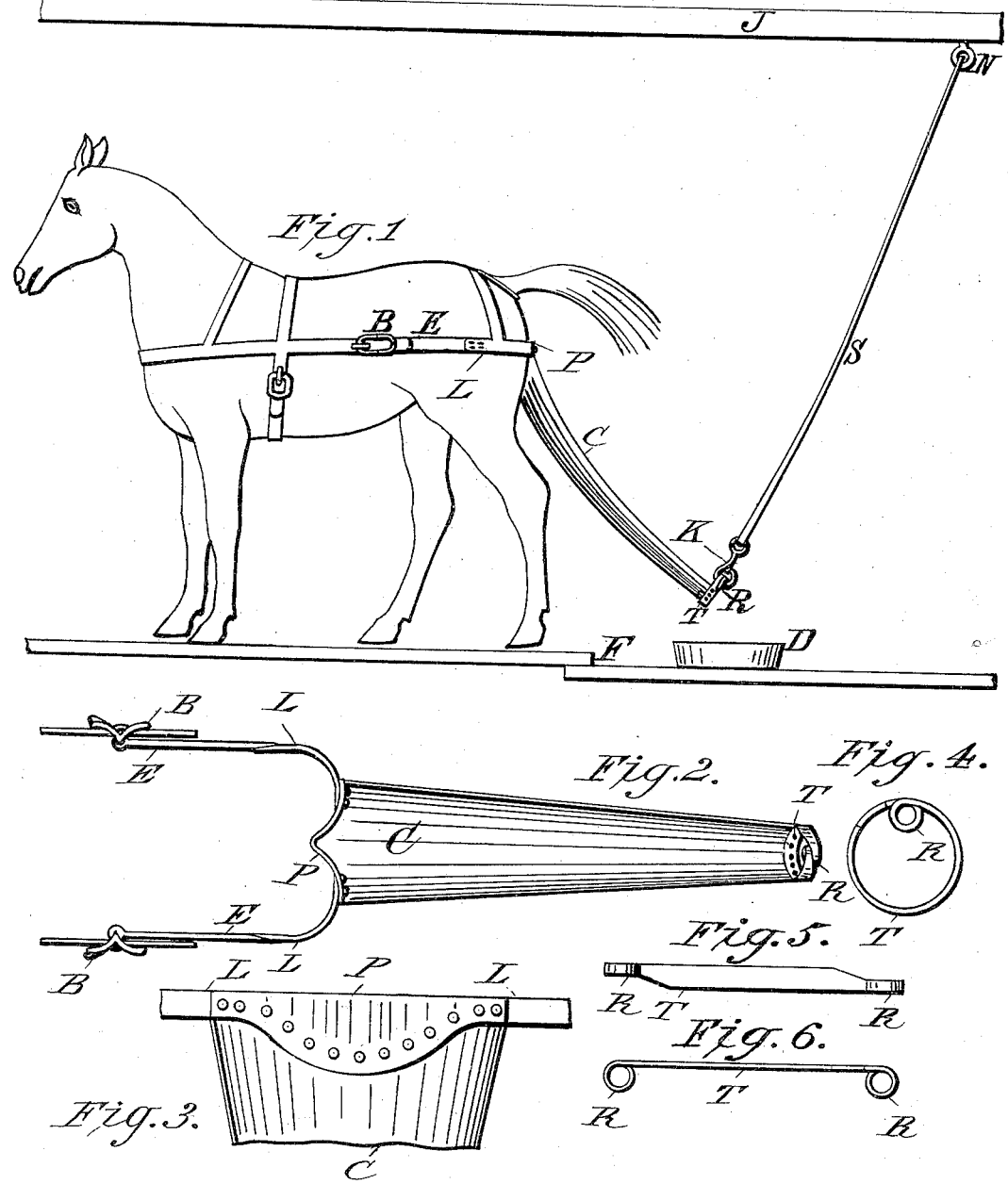

HENRY COLE, OF DENVER, COLORADO.

MANURE AND URINE CONDUIT.

SPECIFICATION forming part of Letters Patent No. 398,379, dated February 26, 1889.

Application filed February 11, 1888. Serial No. 263,744. (No model.)

*To all whom it may concern:*

Be it known that I, HENRY COLE, a citizen of the United States, residing at Denver, in the county of Arapahoe and State of Colorado, have invented a new and useful Manure and Urine Conduit, of which the following is a specification, reference being had therein to the accompanying drawings, in which—

Figure 1 shows my improved device attached to a horse ready for use. Fig. 2 is a top view of the device. Fig. 3 is a back view of the upper portion of the device as it would appear at a point directly behind a horse. Figs. 4, 5, and 6 are views of a spring attached to the lower end of the device.

The object of my device is to afford a means of conducting the residuum or droppings falling from a horse or other animal into a suitable receptacle placed in position behind the horse, as shown in the drawings, and hereinafter more fully explained.

In the drawings, C is the main portion of the device, which I will term the "chute." Chute C is open at the top its entire length and is constructed of any flexible material, so that when attached to the horse it will hang about as shown in Fig. 1.

T is a steel spring attached to the lower end of chute C in any suitable manner. Spring T is provided with rings or eyes R R. When in use, spring T assumes the shape shown in Fig. 4, this shape being retained by the snap K, which is attached to rings or eyes R R. When the snap is removed, the spring opens, as shown in Figs. 5 and 6, when the chute may be easily cleaned.

P is a metal strap shaped to fit the horse, as shown, and attached to chute C at its larger and upper extremity.

L L are two straps, one on each side, composed of leather or any suitable flexible material, attached to metal strap P, as shown.

E E are two elastic straps, one on each side, attached to parts L, as shown. Straps E are attached by any suitable means to a proper appendage for holding the device in position upon the horse. The lower end of the chute is supported and held at any suitable distance above the barn-floor by means of a strap, S, attached by means of a suitable snap, K, to spring R at one extremity, the other extremity being attached to the ceiling of the barn or any other suitable support.

D is a receptacle for the material discharged from chute C.

In the use of my improved device the same is attached to the horse, substantially as shown in the drawings. It may be constructed of any suitable material which will allow it to perform the function herein described—for instance, strap E must be elastic, so as to allow proper expansion of the device, for obvious reasons. Strap P must be rigid, so that the device may fit properly and retain its shape. Chute C must be flexible, so as to allow the horse to lie down and move about in the stall with ease.

I have shown a suitable means of attaching the device to the horse; but I do not confine myself to the means shown, as other suitable means may be used.

I will now mention some of the advantages of my improved device, which demonstrate its usefulness and importance. By virtue of the mechanism heretofore described the manure and, in case of females, the urine are conducted into and retained by a suitable receptacle, and thus kept separate from the bedding in the animal's stall. Thus there is no waste of bedding, and the horse is kept dry and free from contact with the filth which necessarily accumulates and becomes mingled with the bedding upon which he lies where my device is not used. I will also mention the great saving of labor resulting from the advantage just named, by reason of the small quantity of manure to be removed from the barn, the freedom of the animal from filth and stains, and the small amount of labor required in cleaning him, and also the small quantity of bedding required to be placed in the stall.

I am aware of the German patent to Buzer for manure-catching apparatus, dated October 31, 1883, No. 24,628, provided with a chute consisting of a pipe or hose closed except at its extremities; hence I do not claim my chute broadly; but What I do claim as new, and desire to secure by Letters Patent, is—

1. In a manure and urine conduit, a chute, C, open at the top its entire length and provided with a spring, T, containing eyes R at its discharge-opening, in combination with a strap, S, attached at one extremity to said spring by means of a hook, K, and at the other extremity to the ceiling of the barn, substantially as shown and described, and for the purpose set forth.

2. A manure and urine conduit consisting of a chute, C, open at the top its entire length and provided with a spring, T, containing eyes R, in combination with a strap, S, provided with a suitable hook, K, said strap being connected with a spring, T, at one extremity and with a suitable support above at the other extremity, and two straps, E, one on each side, forming part of a suitable means of attachment, substantially as shown and described, and for the purpose set forth.

HENRY COLE.

In presence of—
  M. A. McLAUGHLIN,
  GEO. L. HODGES.